United States Patent
Papay et al.

[11] 3,777,554
[45] Dec. 11, 1973

[54] ULTRASONIC TESTING APPARATUS

[75] Inventors: Charles J. Papay, Calumet City, Ill.; Ralph A. Settle, Gary, Ind.

[73] Assignee: United States Steel Corporation, Pittsburgh, Pa.

[22] Filed: May 27, 1969

[21] Appl. No.: 828,313

[52] U.S. Cl. ............................................. 73/71.5 U
[51] Int. Cl. ............................................. G01n 29/04
[58] Field of Search ................... 73/67–67.9, 71.5; 310/9.5, 73, 310, 8.7, 9.5

[56] References Cited
UNITED STATES PATENTS

| | | | |
|---|---|---|---|
| 3,472,064 | 10/1969 | Kortenhoven | 73/67.8 |
| 2,697,936 | 12/1954 | Farrow | 73/67.9 |
| 2,912,853 | 11/1959 | Hanysz | 73/67.6 |
| 3,289,468 | 12/1966 | Van der Veer | 73/67.8 X |
| 3,378,705 | 4/1968 | Bacon | 73/67.8 X |
| 3,379,051 | 4/1968 | Zeutschel | 73/67.5 X |
| 3,413,843 | 12/1968 | Korlenhoven | 73/71.5 |

Primary Examiner—Richard C. Queisser
Assistant Examiner—John P. Beauchamp
Attorney—Rea C. Helm

[57] ABSTRACT

Apparatus for ultrasonically testing a tube includes means for rotating the tube and feeding it axially, a carriage located below the path of travel of the workpiece, and a plurality of vertical bubbler heads arranged side by side on the carriage so that different circumferential portions of the tube are tested as the tube passes the successive bubbler heads. The carriage also carries a pair of rolls which rest on top of the tube being tested to support the bubbler heads in the correct position. Each bubbler head includes a hollow aluminum body member, a sound wave transmitting plate attached to the bottom of the body member, and a rubber member attached to the top of the body member with a liquid outlet at its top. A crystal is attached to the bottom of the sound wave transmitting plate and water is fed to the side of the bubbler head so that the crystal is kept out of contact with the water.

9 Claims, 7 Drawing Figures

INVENTORS
CHARLES J. PAPAY and
RALPH A. SETTLE
By Martin J. Carroll
their Attorney

ULTRASONIC TESTING APPARATUS

This invention relates to ultrasonic testing apparatus and more particularly to apparatus such as shown in Kortenhoven U.S. Pat. No. 3,413,843 dated Dec. 3, 1968, in which a gimbal support is used in testing a tube. In apparatus of this type of which we have knowledge only one crystal is mounted in each gimbal and a plurality of gimbals are used. While this apparatus can test a tube reasonably well, the speed is lower than that desired. Another disadvantage is that the crystals of the apparatus were immersed in water and deteriorated with use.

It is therefore an object of our invention to provide ultrasonic testing apparatus which can test the workpiece at a greater speed than prior devices without losing effectiveness.

Another object is to provide ultrasonic testing apparatus in which the crystal is protected from contact with the water.

These and other objects will be more apparent after referring to the following specification and attached drawings, in which:

FIG. 5 is a sectional view of a bubbler head and attached crystal;

FIG. 6 is a sectional view of the bubbler head of FIG. 5; and

FIG. 7 is a top plan view of the bubbler head of FIG. 5.

Figure 1:
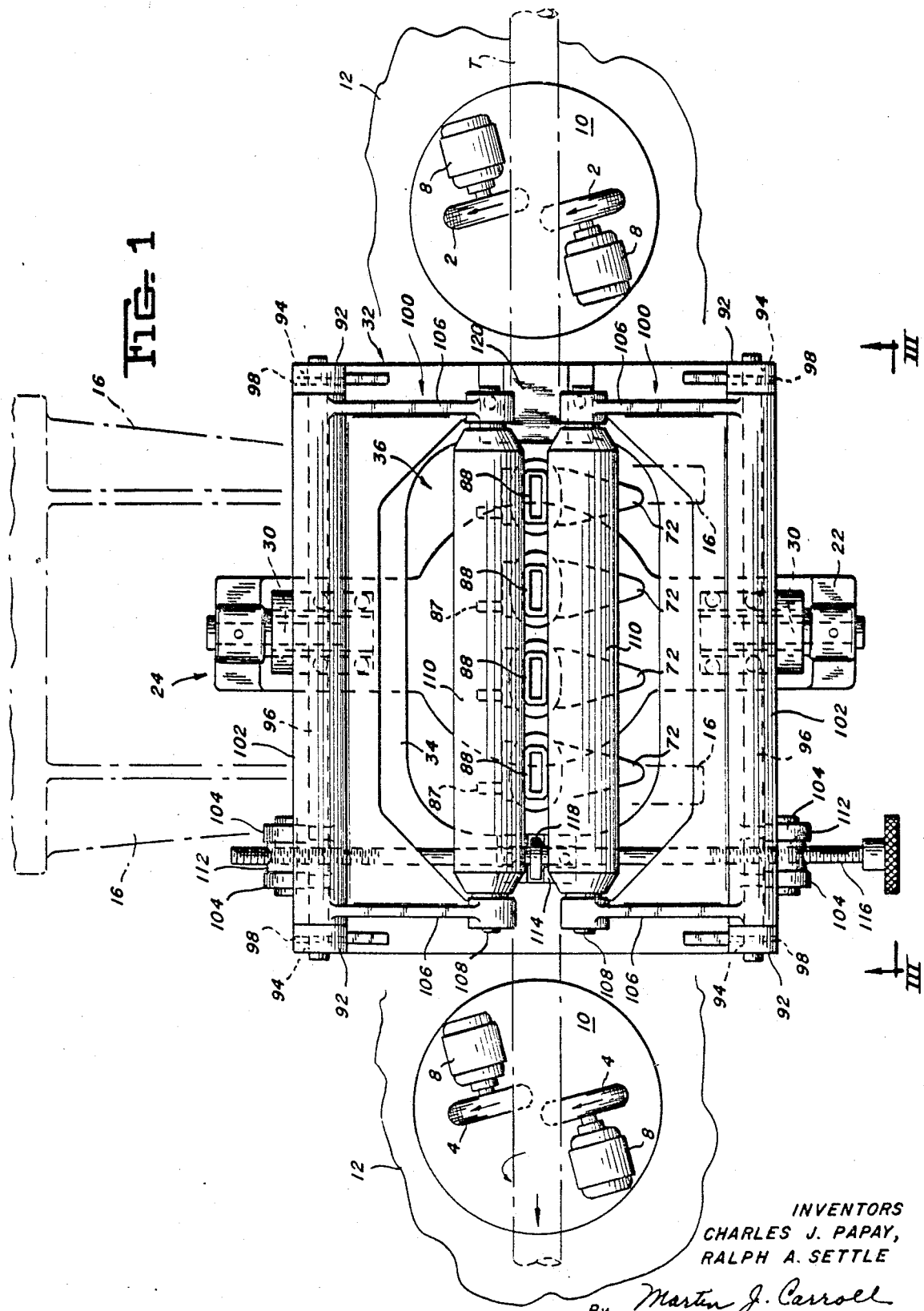
FIG. 1 is a plan view of the apparatus of our invention.

Referring more particularly to FIG. 1 of the drawings, reference numerals 2 and 4 indicate pairs of conveyor rolls which feed the tube or pipe T which is being tested. The feed rolls 2 and 4 are preferably similar to those shown in the Kortenhoven patent referred to above. The rolls 2 and 4 are driven by means of motors 8 which are mounted on a rotatable turret base 10 to enable the rolls 2 and 4 to be arranged at an acute angle to the axis of tube T so that they rotate the tube T about its axis as they feed it axially. The base 10 is mounted on fixed frame 12. Also mounted on the frame 12 by means of a pivot pin 14 (FIG. 2) are a pair of arms 16. An air cylinder 18 connected to arms 16 by means of an arm 20 dampens the up and down movement of the arms 16. Outer member 22 of a gimbal 24 is pivotally connected to arms 16 by means of pins 26. The gimbal 24 is limited in its lower movement by means of threaded bolts or screws 28 threaded through threaded holes in the main frame 12 with the top of one screw 28 abutting a cross member 29 between the arms 16 and the top of the other screw 28 abutting the outer gimbal member 22. The parts so far described are essentially the same as in the above identified Kortenhoven patent.

Figure 2:
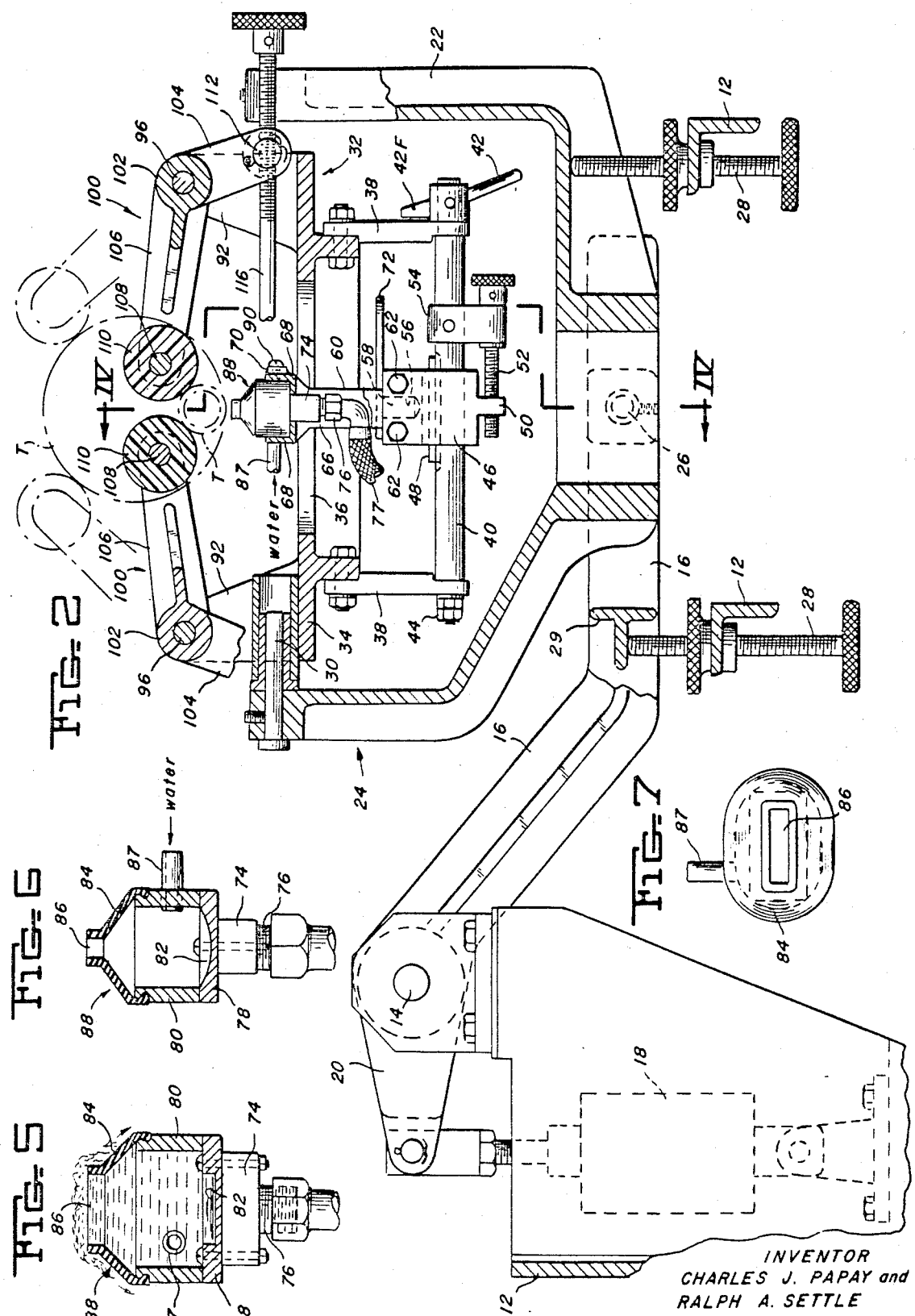
FIG. 2 is a vertical sectional view of the apparatus of FIG. 1 taken essentially on the transverse center but with some parts broken away.
Figure 3:
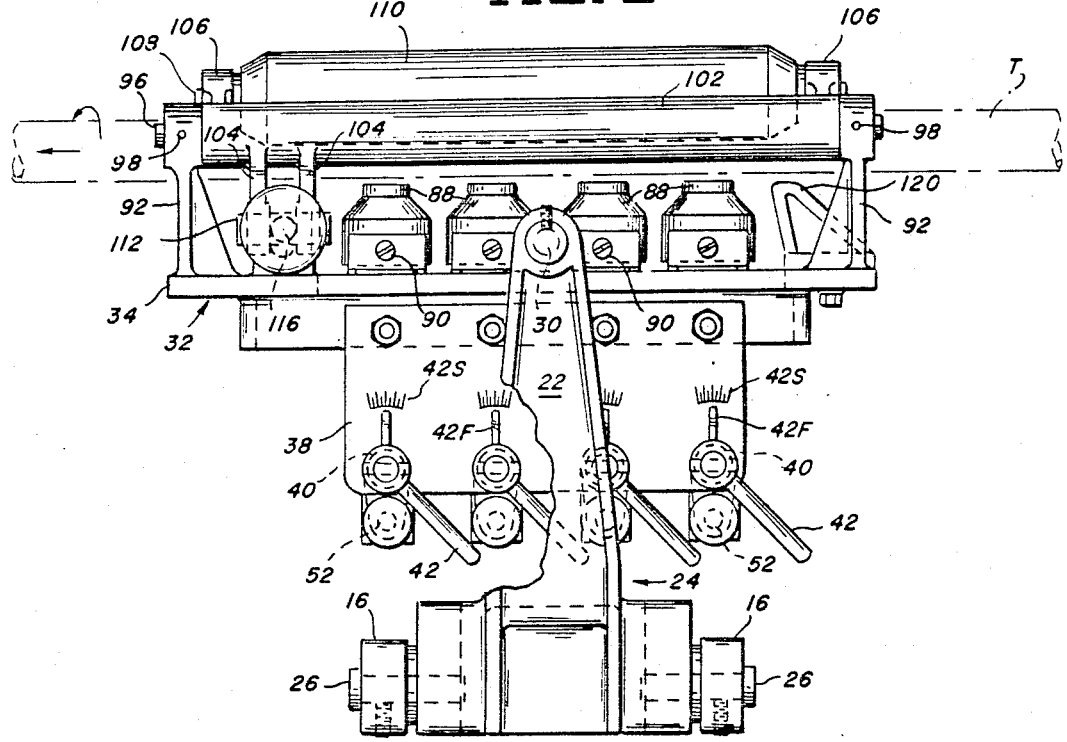
FIG. 3 is a view taken on the line III—III of FIG. 1.
Figure 4:
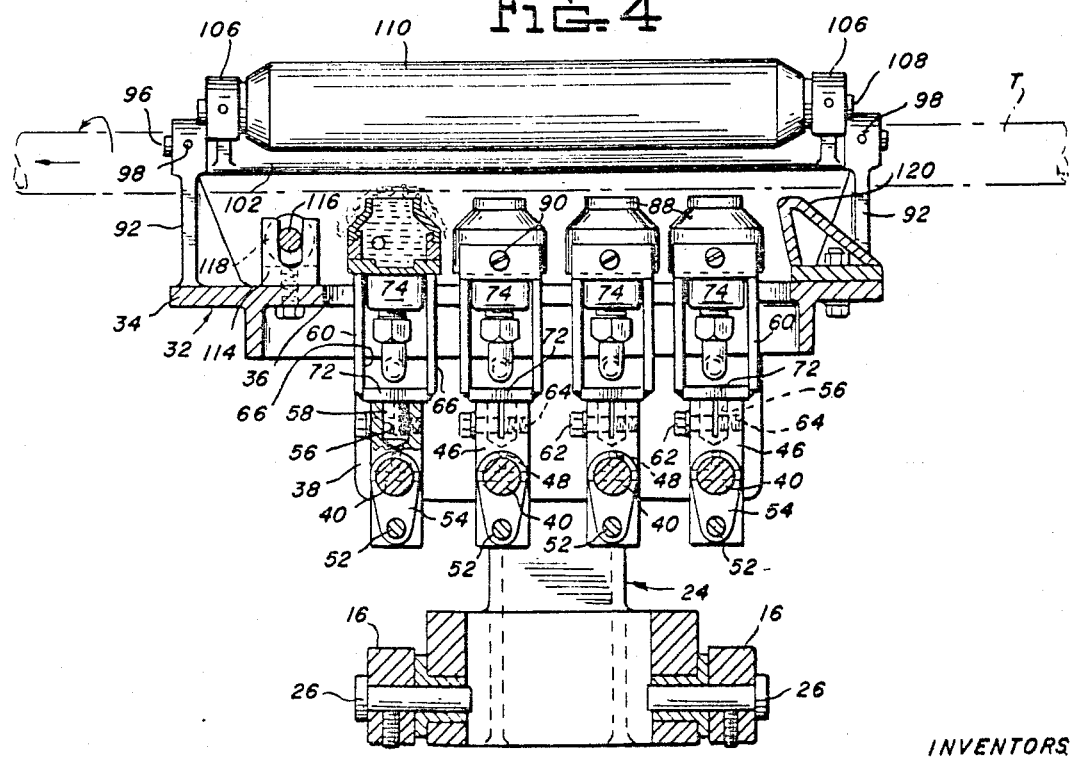
FIG. 4 is a view taken on the line IV—IV of FIG. 2.

As seen in FIG. 2 the outer member 22 is generally U-shaped with two spaced apart vertical legs. Axially aligned pins 30 are mounted in the tops of the legs of the outer member 22 and pivotally support an inner gimbal member or carriage 32 which includes a generally horizontal plate 34 having a vertical opening 36 therethrough. A pair of spaced apart vertical plates 38 are attached to and depend downwardly from the plate 34. Each plate 38 has four holes in its lower end aligned with the corresponding holes in the other plate. A shaft 40 extends through each pair of aligned holes and has an adjusting handle 42 attached to one end thereof on the outside of plate 38. The other end of each shaft 40 is threaded for receiving lock nuts 44 to clamp the shaft in adjusted position. A finger 42F forming part of the handle extends upwardly with its top adjacent a scale 42S (FIG. 3) on the plate 38. A slide block 46 (FIGS. 2 and 4) is keyed to the shaft 40 by means of a key 48 and is slidable therealong. The bottom of the slide block 46 has an internal threaded portion 50 for receiving an adjusting screw 52 which is supported on a collar 54 pinned to the shaft 40. The shaft 40 and adjusting screw 52 are parallel to one another. The top of the slide block 46 is split on each side of a vertical hole 56 (FIG. 4) which receives pin 58 of a bubbler head bracket 60. The bubbler head bracket 60 is locked in place by means of bolts 62 which are threaded into openings 64 in the slide block 46. Each opening 64 on one side of the split in the block is threaded for this purpose. The bracket 60 includes a hollow frame 66 having the pin 58 attached to its bottom and a pair of angles 68 forming its top. A nut 70 (FIG. 2) is welded to the vertical leg of one of the angles 68 with its threaded opening in axial alignment with a threaded hole through the angle. A radial handle 72 (FIGS. 2 and 4) is secured to the bottom of the frame 66.

A Branson crystal 74 (FIGS. 2, 4, 5 and 6) having a fitting 76 at its lower end is supported within the hollow frame 66. A conduit 77 connected to the fitting 76 contains wires which connect the crystal to current generating means and to an oscilloscope (not shown). The crystal 74 is mounted on the underside of one quarter inch plate (FIGS. 5 and 6) which in turn is bonded to an aluminum hollow member or tube 80. The plate 78 has an elongated concave curved recess 82 in its upper side. This focuses the ultrasonic beams to permit them to pass unobstructed into the tube T. The plate 78 is made of a material which readily passes sound waves such as acrylic resins. One such material is sold under the trademark LUCITE. A rubber nipple 84 is placed over the aluminum member 80 and has a restricted oblong opening 86 through the top thereof. A water supply pipe or conduit 87 is attached to the cylinder 80. The parts 78, 80 and 84 form a bubbler head 88 which is secured to the bracket 60 by means of a screw 90 (FIGS. 2, 3 and 4) threaded through nut 70 and aligned opening.

Four brackets 92 (FIGS. 1, 2, 3 and 4) extend upwardly from the plate 34, one at each corner thereof with a horizontal hole 94 in the top thereof. The brackets 92 are arranged in pairs with the holes in each pair of brackets being in alignment. A hanger shaft 96 passes through each pair of aligned holes 94 and is secured from rotation by means of a pin 98. Mounted on each shaft 96 is a roller arm 100. Each roller arm 100 includes a sleeve 102 which is rotatably supported on shaft 96. A pair of spaced apart short arms 104 extend from the sleeve 102 in an outwardly and downward direction and a pair of longer arms 106 extend from the sleeve 102 toward the bubbler head. The ends of the arms 106 have aligned holes therein for receiving a shaft 108 which supports a rotatable roller 110. An adjusting nut 112 is received in openings in the arms 104. Mounted on the plate 34 is a bifurcated stop block 114. An adjusting screw 116 is threaded through the adjusting nuts 112. One of the adjusting nuts has a left hand thread and the other a right hand thread to engage corresponding threads on the adjusting screw 116. A washer 118 is secured to the adjusting screw 116 and is received between the arms of the stop block 114. A guide bracket 120 attached to the top of the plate 34 in line with the bubbler heads 88 prevents the tube T being tested from damaging the bubbler heads. The parts described in this paragraph are essentially the same as in the Kortenhoven patent.

In operation, the crystals and bubbler heads 88 are individually adjusted so as to correctly orient them with the tube T being tested. The desired adjustment may be made by individually turning each shaft 40 by means of its handle 42 and then locking them in position. The block 46 may be moved along the shaft 40 by rotating the screw 52 and the bubbler head 88 may be turned about its axis by turning handle 72. The rolls 110 are positioned according to the diameter of the tube to be tested by rotating screw 116. Normally this position is such that the top of the bubbler head 88 is approximately ¼ inch below the bottom of the tube. The conveyor rolls 2 and 4 are adjusted so that they will rotate the tube through 360° as it travels the distance between the first and last bubbler heads. With water flowing through pipes 87 into the bubbler heads and bubbling out of openings 86 and with the crystals connected to the current generating means and to the oscilloscope the tester is ready for operation. The tube T is then fed by rolls 2 over the guide 120 and beneath the rolls 110 so that the tube T functions to support carriage 32. As the tube T passes over each bubbler head 88 reflections from any defects in the tube are read on the oscilloscope in the usual manner. Since the tube is rotating, readings are obtained for the complete periphery of the tube.

While one embodiment of our invention has been shown and described, it will be apparent that other adaptations and modifications may be made without departing from the scope of the following claims.

We claim:

1. In apparatus for ultrasonically testing a workpiece in which ultrasonic waves pass from a crystal upwardly through a liquid to the workpiece, the improvement comprising a hollow liquid tight bubbler head for receiving said liquid and extending between said crystal and said workpiece, said bubbler head having an outlet at the top thereof, means for attaching said crystal to the outer surface of the bottom of said bubbler head, and means for feeding liquid to the inside of said bubbler head.

2. The apparatus of claim 1 in which said bubbler head includes a hollow aluminum body member having top and bottom openings, a sound wave transmitting plate attached to the bottom of said body member and closing the bottom opening, and a rubber member attached to the top of said body member around said top opening and extending upwardly and inwardly to said top outlet.

3. The apparatus of claim 2 in which said body member and said top outlet each have an oblong horizontal shape, and said sound wave transmitting plate has an oblong concave curved recess in its upper surface.

4. Apparatus for ultrasonically testing a cylindrical workpiece which comprises means for rotating said workpiece about its axis and feeding it axially; a carriage located below the path of travel of said workpiece; a plurality of generally vertical bubbler heads arranged side by side with their vertical axes in the plane of travel of the workpiece and their tops below the workpiece; each of said bubbler heads having a hollow aluminum body member having top and bottom openings, a sound wave transmitting plate attached to the bottom of said body member and closing its bottom opening, and a rubber member attached to the top of said body member around said top opening and extending upwardly and inwardly to said top outlet; means for supporting said bubbler heads on said carriage; means for individually adjusting the positions of said bubbler heads and means for adjusting said rotating and feeding means to rotate the workpiece through at least 360° between the first and last of said bubbler heads.

5. Apparatus for ultrasonically testing a cylindrical workpiece which comprises means for rotating said workpiece about its axis and feeding it axially, a carriage located below the path of travel of said workpiece, a plurality of generally vertical bubbler heads arranged side by side with their vertical axes in the plane of travel of the workpiece and their tops below the workpiece, a pair of spaced apart vertical plates attached to said carriage below said bubbler heads, a plurality of shafts extending between and rotatably adjustable in said plates, means for holding said shafts in individually adjusted position, a block non-rotatably mounted on each shaft for movement therealong, means for holding said block in adjusted position, a bracket for supporting each of said bubbler heads, means for supporting each bracket on one of said blocks for adjustment about its vertical axis and means for adjusting said rotating and feeding means to rotate the workpiece through at least 360° between the first and last of said bubbler heads.

6. Apparatus according to claim 5 including a pair of rolls adapted to contact and rest on top of a workpiece being tested, and means for supporting said pair of rolls on said carriage in a centered position.

7. Apparatus according to claim 6 in which each of said bubbler heads includes a hollow aluminum body member having top and bottom openings, a sound wave transmitting plate attached to the bottom of said body member and closing its bottom opening, and a rubber member attached to the top of said body member around said top opening and extending upwardly and inwardly to said top outlet.

8. Apparatus according to claim 6 including a gimbal member having two spaced apart vertical arms, means pivotally mounting said carriage adjacent the top of said vertical arms for free movement about a horizontal axis, and means for supporting said gimbal member for limited vertical movement.

9. Apparatus according to claim 8 in which each of said bubbler heads includes a hollow aluminum body member having top and bottom openings, a sound wave transmitting plate attached to the bottom of said body member and closing its bottom opening, and a rubber member attached to the top of said body member around said top opening and extending upwardly and inwardly to said top outlet.

* * * * *